F. DUSENBURY.
BUGGY SEAT.
APPLICATION FILED JULY 19, 1909.
982,484.
Patented Jan. 24, 1911.
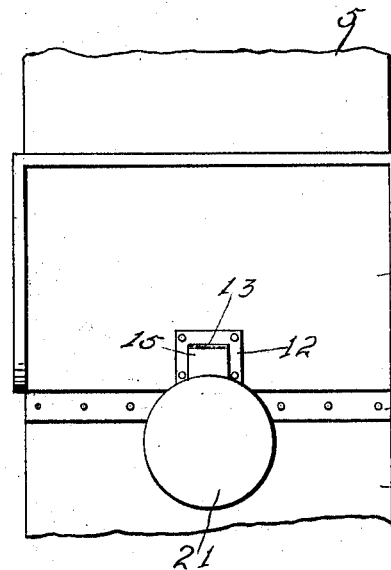
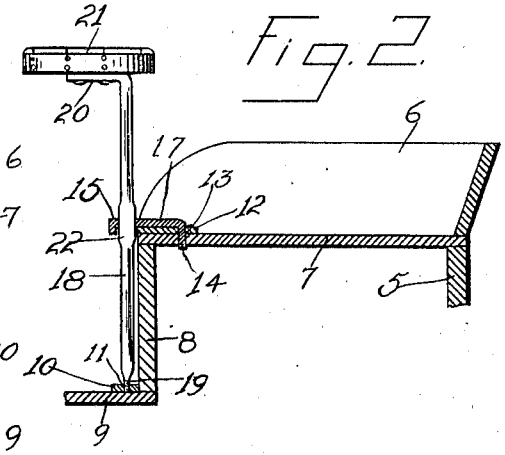
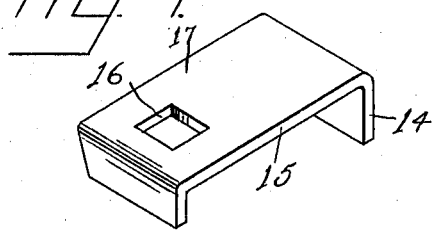
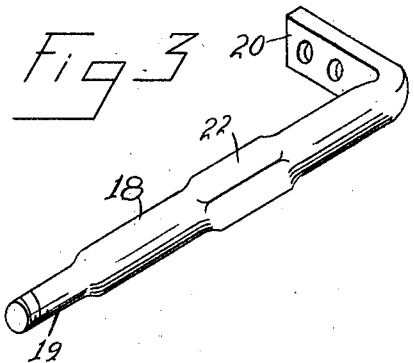
Witnesses
J. E. Strobel.
Inventor
FRANK DUSENBURY.
By
Attorneys

UNITED STATES PATENT OFFICE.

FRANK DUSENBURY, OF MENA, ARKANSAS.

BUGGY-SEAT.

982,484.

Specification of Letters Patent.

Patented Jan. 24, 1911.

Application filed July 19, 1909. Serial No. 508,350.

*To all whom it may concern:*

Be it known that I, FRANK DUSENBURY, a citizen of the United States, residing at Mena, in the county of Polk, State of Arkansas, have invented certain new and useful Improvements in Buggy-Seats; and I do hereby declare the following to be a full, clear, and exact description of the invention, such as will enable others skilled in the art to which it appertains to make and use the same.

The invention relates to a buggy seat and more particularly to the class of detachable auxiliary seats for use in wagons buggies or other vehicles.

The primary object of the invention is the provision of a seat of this character which may be detachably mounted in the body of the vehicle and that is capable of being adjusted in varying position with respect to the main seat of the vehicle for the accommodation of the user and also convenience relative to the remaining occupant of the main seat of said vehicle.

Another object of the invention is the provision of an auxiliary or supplemental seat for vehicles whereby a third person may ride with ease and comfort to all the occupants of the vehicle.

A still further object of the invention is the provision of a supplemental or auxiliary seat which is simple in construction which is capable of being applied or positioned in a vehicle body for convenience of the occupant, and that is thoroughly reliable and efficient and inexpensive in the manufacture.

In the drawings accompanying and forming part of this specification is illustrated the preferred form of embodiment of the invention, which to enable those skilled in the art to practice the invention, will be set forth at length in the following description while the novelty of the invention will be pointed out in the claim hereunto appended.

In the drawings:—Figure 1 is a fragmentary top plan view of a vehicle body and its seat with the invention applied thereto. Fig. 2 is a sectional view thereof. Fig. 3 is a detail perspective view of the seat standard removed from the vehicle body. Fig. 4 is a detail perspective view of one of the connecting plates for the standard.

Similar reference characters indicate corresponding parts throughout the several views in the drawings.

In the drawings, the numeral 5 designates generally a vehicle body which is of the ordinary and well known construction provided with a main seat 6, of ordinary form and of a dimension sufficient for the comfortable occupancy of two persons. This seat has the usual bottom 7, and a front fall board 8, which extends from said bottom to the floor or bottom 9, of the vehicle body.

Extending transversely of the vehicle body floor 9, contiguous to the front fall board 8 of the main seat and secured to said floor is a brace bar or strip 10, preferably formed of metal and containing a central opening 11, the purpose of which will be hereinafter more fully described.

Fixed centrally to the bottom 7 of the main seat 6 at its front edge is a plate 12, which latter contains a central elongated slot or opening 13, detachably receiving the leg 14, of a casting forming a connecting bracket or member 15, the same being formed with a squared opening 16, in its right angular portion 17, for the detachable and adjustable mounting of a supplemental or auxiliary seat which will be hereinafter described.

The auxiliary or supplemental seat comprises a vertical staff or standard 18, having a reduced lower end 19, the same being adapted to fit in the opening 11, of the bar 10, when fitting the auxiliary seat in the vehicle body. The standard 18, has its upper extremity bent to form a right angular extension 20, to which latter is fixed an auxiliary seat 21. The standard or staff 18, is formed with a squared enlarged portion 22, with respect to its remaining portion and this squared portion 22, is of a corresponding size with respect to the opening 16, in the connecting bracket 15, and when fitted within the said opening will rigidly hold the auxiliary seat against displacement. It is obvious that the standard or staff 18, may be turned for arcuate adjustment of the auxiliary seat 21 with respect to the main seat 6 of the vehicle body. It is also apparent that this auxiliary seat may be readily detached from the vehicle body at the will of the teamster. Also the plate 17, is made detachable from the plate 12, so that said plate 17, may be detached from its connection with the main seat of the vehicle when the auxiliary seat is not in use, otherwise this plate would project forwardly of the seat and thereby inconvenience or interfere with the occupant thereof. The lower extremity 19, of the standard 18, is threaded so that it may be securely fastened to the strip 10, prior to the plate 17, being brought into engagement with the plate on the main seat of the vehicle and in this manner the standard will be prevented from jarring out of the strip 10 or rattling during the travel of the vehicle.

From the foregoing the construction and operation of the invention will be clearly obvious without the necessity of a more extended explanation and therefore the same has been omitted.

What is claimed is:—

The combination with a vehicle body having a main seat of a brace bar fixed to the said body contiguous to the fall board of the main seat and containing a central threaded opening, a slotted plate fixed centrally to the seat at the front thereof, a standard having a reduced threaded end detachably engageable in the threaded opening and an outturned opposite end, an auxiliary seat secured to the said outturned end of the standard, the said standard being provided with a squared portion in cross section medially of its ends, a plate having a squared opening engageable with the squared portion of the standard and adapted to be moved longitudinally of the standard, whereby the same may be rotated and detached from the brace bar, the said plate being formed with a right angular ear terminal detachably engaging in the slotted plate on the seat.

In testimony whereof, I affix my signature, in presence of two witnesses.

FRANK DUSENBURY.

Witnesses:
 M. B. LEGATE,
 W. T. ADAMS.